INVENTOR.
ANTONIUS BOEKHORST
BY
Frank R. Trifari
AGENT

INVENTOR
ANTONIUS BOEKHORST
BY
Frank R. Jaforin
AGENT

United States Patent Office 3,435,279

Patented Mar. 25, 1969

3,435,279

CIRCUIT ARRANGEMENT FOR PRODUCING A SAWTOOTH CURRENT THROUGH A DEFLECTION COIL AND A HIGH VOLTAGE

Antonius Boekhorst, Emmasingel, Eindhoven, Netherlands, assignor to North American Philips Company, Inc., New York, N.Y., a corporation of Delaware Filed June 15, 1965, Ser. No. 464,097
Claims priority, application Netherlands, June 18, 1964, 6406921
Int. Cl. H01j 29/70
U.S. Cl. 315—27 12 Claims

ABSTRACT OF THE DISCLOSURE

A circuit for regulating the final anode voltage of a cathode ray tube includes a transformer having a primary winding in which a sawtooth current is produced and a secondary winding for supplying said anode voltage. Reactive coupling means comprising a variable inductor in series with a tertiary winding couple the primary and secondary windings. The inductance of the variable inductor is varied as a function of the high voltage load current so as to maintain the current through the inductor and the voltage across it at a zero value at the beginning and at the end of the flyback period.

This invention relates to a circuit for regulating the high voltage of a cathode ray tube. The circuit includes means for producing a sawtooth current in a deflection coil and a high voltage for the display tube. The circuit further comprises a deflection generator having an output that includes at least one transformer having a primary winding to which the deflection coil is coupled and a secondary winding to which a rectifier is connected for rectifying the fly-back pulses appearing during the fly-back period of the sawtooth current. The rectified pulses are applied as a high voltage to the final anode of the display tube. A reactive coupling is provided between the primary winding and the secondary winding. The high voltage is stabilized by means of a control circuit which varies, as a function of the high voltage load, a reactance connected in parallel with at least part of the primary inductor.

Such arrangements are known from U.S. Patent 2,494,241. It is proposed therein to connect a variable reactance in parallel with the deflection coil. The variable reactance is controlled in accordance with the high-voltage load formed by the display tube so that the ratio between the high voltage and the deflection current remains substantially constant.

In order to keep the deflection current constant, it is proposed in said patent to maintain, by means of a parallel-connected efficiency diode, a constant forward stroke voltage across the deflection coil so that the high-voltage itself will also remain constant, which is the most desirable condition. Of course, other known stabilizing methods also may be employed.

This is particularly important for colour television wherein a shadow mask display tube is used in which adjustments, such as that of colour purity and convergence, are obtained by means of permanent magnetic fields. The effect thereof on the electron beams depends upon the final anode voltage so that the latter should remain accurately consant. In colour television tubes the power derived from the high voltage may rise to a particularly high value with respect to the power required for maintaining the deflection field. As a result, there is a great need for a circuit arrangement which renders both the deflection current and the high voltage insensitive to load variations.

The arrangement described in said patent cannot meet these severe requirements because the reactance circuit only produces a reduction of the fly-back time with an increasing high-voltage load. The ratio between the fly-back voltage and forward sweep voltage is varied in favour of the high voltage, it is true, but the region in which this arrangement can operate without objection is too small for the requirements of colour television. Moreover, the power to be worked by the arrangement for deflection and for the high voltage is several times higher than that of projection television, to which said patent relates. As a result the power to be worked by the reactance arrangement would become so high that practical realisation cannot be obtained on an economical basis.

Moreover, the reduction of the fly-back time had to be fairly great in order to obtain a satisfactory compensation of the so-called second internal resistance of the high-voltage source. This may be illustrated by the following example.

In practice a second internal resistance of about 3mohms may be envisaged for the high voltage source with the conventional means. This means that with a beam current in the display tube of for, example, 2 ma. a voltage drop of 6 kv. appears, for example, a drop from 25 kv. to 19 kv. If this is to be compensated the high-voltage E.M.F. has to be raised to 31 kv. in order to have finally available 25 kv. in the loaded state. On the basis of a fly-back period of 18% of one period of the sawtooth signal in the no-load state, the time has to be reduced in the loaded state to about 15%, which means an increase in fly-back frequency. The formula on which this calculation is based is:

$$\frac{V \text{ fly-back}}{V \text{ forward stroke}}=\frac{\pi}{2}\,\frac{1-p}{p}+2/\pi$$

wherein $p$ is the ratio between the fly-back time and the forward-sweep time. See "Television Deflection Systems," p. 88, Philips Technische Bibliotheek. This means an increase in fly-back frequency of about 20%.

All modern deflection transformers are provided with a so-called "third-harmonic tuning" for preventing interference oscillations at the beginning of the fly-back time and the consequent loss of energy. Such a great reduction of the fly-back time would, however, bring about a complete loss of the "third harmonic tuning" so that the arrangement could no longer function properly. For use with colour television other measures are therefore required in order to obtain the desired result.

According to the invention, the desired objects achieved by a considerably smaller reduction of the fly-back time, which is attended with an automatic adaptation of the "third harmonic tuning," if the reactive coupling is provided with a variable reactive element, which is varied by said control-circuit so that, for substantially any high-voltage load, both at the beginning and at the end of the fly-back, the current through this reactive element and the voltage across it are zero.

In a further embodiment of the arrangement according to the invention an increase in transformation ratio is, at the same time, produced between the winding on the transformer providing the deflection (the so-called primary winding) and the winding supplying the high-voltage rectifier (the so-called secondary winding) as soon as the high voltage is loaded. To this end an arrangement in this embodiment is characterised in that the variable reactive element is connected in series with a tertiary winding, which is magnetically coupled with the secondary winding to the maximum extent. This series combination is coupled with at least part of the primary winding. This embodiment also includes the series combination of a fixed impedance and the same tertiary winding coupled with a smaller part of the primary winding.

This variation in transformation ratio supports the increase in flyback time reduction so that the fly-back time reducer may be smaller than without said support, which simplifies the adaptation to the "third harmonic tuning."

In order to act upon the transformation ratio, the initial coupling between the primary winding and the secondary winding of the transformer must not be very fixed. To this end, according to the invention, the secondary winding, or a part thereof, could be arranged on a separate transformer core, but as an alternative, it may be arranged on the same core as the primary winding, but at such a distance therefrom that a large stray inductance is produced.

In practice this means that when using two so-called U-shaped cores, which are united to form a single magnetic circuit, the primary winding and the secondary winding are disposed on opposite limbs of the core. In addition, a tertiary winding is coupled to the secondary winding. The tertiary winding is connected through a low inductance to a part of the primary winding so that the stray inductance is reduced to the value at which "third harmonic tuning" is attained. The tertiary winding is, moreover, connected through a variable inductor, to a further part of the primary winding, which comprises a greater number of turns than the first mentioned part.

A few possible embodiments of circuit arrangements according to the invention will be described with reference to the accompanying figures.

Figure 1:
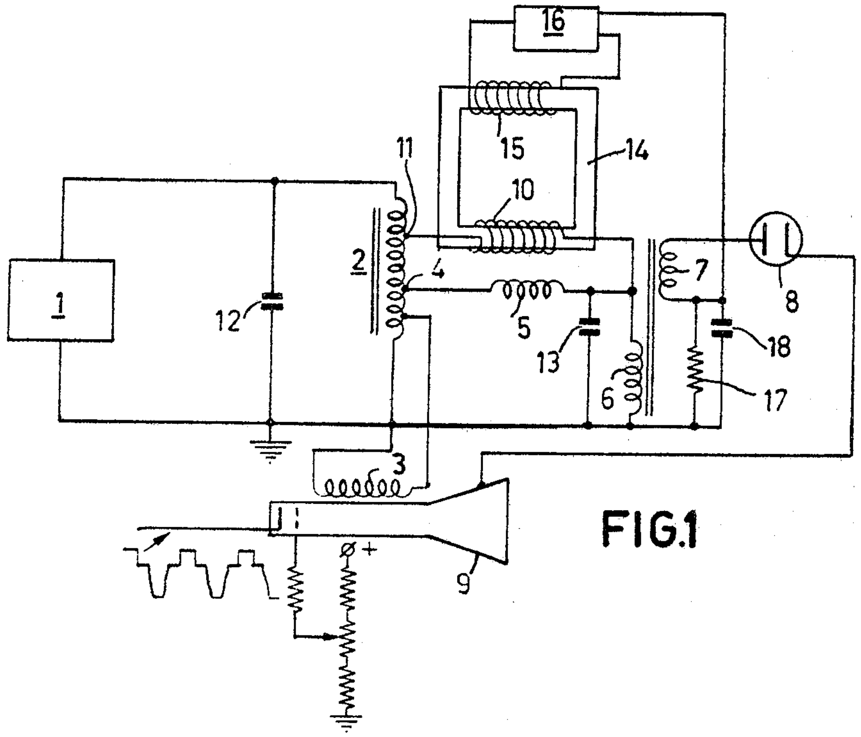
FIG. 1 is a first embodiment in which the primary winding and the secondary winding are wound on separate cores.

Referring to FIG. 1, reference numeral 1 designates a deflection generator, which is supposed to have a natural internal resistance, hereinafter termed the first internal resistance, of such a low value that the deflection current always remains constant in spite of the load on said generator.

To this end known stabilizing methods are available, which need no further explanation.

To the primary winding of the deflection transformer 2 there is connected a deflection coil 3. Through a tapping 4, an inductor 5 and a tertiary winding 6, a secondary winding 7 is coupled with the primary winding. The winding 7 is, moreover, connected to a high voltage rectifier 8, which supplies the anode voltage for the final anode of a display tube 9. The tertiary winding 6 is, in addition, connected through a variable inductor 10 to a tapping 11 of the primary winding. The manner in which the variable inductor 10 can be varied as a function of the high voltage load will be described more fully hereinafter.

The fly-back time is chiefly determined by the natural oscillatory time of the circuit represented by all capacitances of the circuit, transformed to the primary, shown here as a capacitance 12 in parallel with the primary winding. The so-called "third harmonic tuning" is also determined by the value of the stray inductance between the primary and the secondary taking account of all relevant stray capacitances, represented diagrammatically by the capacitance 13 in parallel with the tertiary winding 6.

The inductor 5 is chosen so that (with a high value of the inductor 10) the "third harmonic tuning" is just obtained.

If it is supposed in the first place that the primary winding and the secondary winding are arranged on separate transformer cores, as shown in FIG. 1, it will be obvious that the sole coupling between the two windings (apart from any capacitative couplings) is established through the tertiary winding 6, the fixed inductor 5 and the variable inductor 10. These coupling inductors 5 and 10 constitute, moreover, an inductive potentiometer for that part of the primary winding which is present between the tappings 4 and 11.

As long as the inductor 10 is high with respect to the inductor 5 the tertiary winding 6 is, in fact, connected to the low tapping 4 of the primary winding and this determines the transformation ratio and hence also the high voltage produced on the side of the secondary.

If the inductor 10 is reduced, three consequences are involved:

In the first place the tertiary winding 6 receives an ever increasing part of the primary voltage, which involves an increase in transformation ratio.

Thus, when the primary voltage remains the same the secondary voltage and hence also the high voltage will increase. In this way the second internal resistance is, so to say, reduced. The first internal resistance is, as stated above, that of the generator 1 itself. The second internal resistance is, in fact, formed by the aforesaid stray inductance and is the cause of the fact that, even if the primary voltage were kept completely constant with an increasing high-voltage load, the high-voltage itself would nevertheless drop. By reducing the inductance 10, the coupling between the primary winding and the secondary winding is increased since the voltage derived from the tapping 4 is supported by the voltage derived from the tapping 11, and also because the voltage drop across the inductance 10 decreases. The second internal resistance is formed by the inductors 5 and 10 for the device shown in FIG. 1, and if a single core is used, by the stray inductance between the primary winding and the secondary winding. The latter case will be described more fully with reference to FIG. 2.

In the second place the reduction of the inductance 10 results in that part of the primary winding which lies between the tappings 4 and 11, has connected in parallel with it an ever decreasing inductance, that is to say the series combination of the inductors 5 and 10, so that the overall primary inductance is reduced and the tuning frequency is raised. This results in a shortening of the fly-back time, which results in a higher fly-back voltage for a constant forward sweep voltage.

Thirdly, the reduction of the inductor 10 also results in a reduction in the total apparent stray inductance formed by the inductors 5 and 10 so that the "third harmonic tuning" is adapted to the reduced fly-back time.

With a suitable proportioning a correspondence between the decrease of the primary inductance in percent and the said stray inductance can be obtained such that the "third harmonic tuning" is maintained under all conditions. This is essential to avoid interference oscillations at the beginning of the fly-back and for a satisfactory output of the arrangement. Owing to said change in transformation ratio a smaller reduction of fly-back time may be sufficient (smaller than the reduction referred to above from 18% to 15%), so that also the detuning to obtain an adaptation to the "third harmonic tuning" may be smaller than without said change. Thus the problem of synchronism is also simplified. This can be more easily achieved for a smaller detuning range than for a larger one.

Dutch Patent Specification 88,020 discloses that the so-called "third harmonic tuning" is obtained when, both at the beginning and at the end of the fly-back time, the current across the stray inductance and the derivative thereof are zero. Since the derivative of the current $$\frac{di}{dt}-$$

times the inductance L of this stray inductance is the same as the voltage across it $$\left(V=-L\frac{di}{dt}\right)$$

reference may be made to the voltage instead of the derivative of the current. It will furthermore be obvious that a variable capacitance may be used instead of the self-inductance 10. In this case the variable capacitance has to be varied as a function of the high-voltage load so that the same three effects are obtained as those described with the variation of the inductor 10.

It should be noted that a satisfactory synchronism between the "third harmonic tuning" and the reduction of the fly-back time can be obtained by a correct choice of the tappings 4 and 11. In this case, for a given variation of the inductor 10, the displacement of one of the tappings 4 or 11 will result in that the series combination of the inductors 5 and 10 will prevail over a larger or smaller portion of the primary winding in parallel and in this way the reduction of fly-back time can be determined for a large part, whereas the variation of the stray inductance is determined, as before, mainly by the variation of the inductor 10. The possibility of chosing a correct tapping provides so to say an additional degree of freedom. This is, of course, related to the variation of the transformation ratio, since just the voltage obtained from the tapping 4 is supported by the voltage derived from the tapping 11.

A satisfactory synchronism may be furthered by connecting, in series with the tertiary winding 6, a further fixed inductor (not shown in FIG. 1).

The above consideration also applies when the primary winding and the secondary winding of the transformer are disposed on one core. A condition for the satisfactory operation is only that it must be possible the vary the magnetic flux in the core at the area of the secondary winding without great variation of the magnetic flux in the core at the area of the primary winding. This may be carried out by spacing the two windings apart to such an extent that a sufficiently large part of the magnetic field of the transformer is not embraced simultaneously by the two coils.

The higher voltage produced in the secondary winding by a reduction of the inductor 10 may serve for compensating the voltage drop across the second internal resistance of the high-voltage source, when current is derived therefrom. By rendering the inductor 10 automatically dependent upon said load current, compensation can be obtained such that, within the limits set by the proportioning of the arrangement, a substantially constant high voltage and a constant deflection current are obtained.

To this end the variable inductor 10 is formed by a transductor. The transductor comprises a core 14 having a non-linear magnetic inductance B vis. magnetic field intensity H characteristic curve. By causing the direct current through the winding 15 to increase with an increase in the high voltage load, the permeability of the core material 14 will decrease so that the inductance of the inductor 10 is reduced.

The direct current is passed through the winding 15 by means of a direct-current amplifier 16, to which the winding 15 is connected. The amplifier 16 is controlled by means of the voltage drop across the resistor 17, which is shunted by a smoothing capacitor 18. With an increasing beam current in the display tube 9 the voltage drop across the resistor 17 increases and hence the direct current through the amplifier 16. As a result, the material of the core 14 is further saturated so that the permeability of the core material decreases.

In principle, it is, of course, not necessary to use an additional amplifying stage 16 for controlling the winding 15. This winding might also be connected directly in series with the secondary winding 7 (the network 17, 18 being omitted), so that the beam current of the tube 9 passes directly through the winding 15. For practical reasons this is, however, less attractive, since in order to saturate a ferrite core a field intensity H of about 5 to 10 ampere turns per cm. is required. With a beam current of for, example, 1.5 ma. and a length of the magnetic circuit of, for example, 15 cms. the required number of turns would be about 70,000, which is not quite feasible in practice. However, by amplifying the beam current by means of the amplifier 16 before it is applied to the winding 15, the number of turns can be materially reduced, so that a practical form of the transductor can be obtained.

A further possibility is obtained by providing the deflection generator 1 with a stabilizing circuit which varies, in known manner, the direct supply voltage taken by said generator as a function of the high-voltage load. The current variation is sufficiently great, in practice about 200 times greater than the beam current itself, so that it is sufficient for the transductor coil 15 to be adapted thereto and to be included in the supply circuit of the deflection generator 1. In general, a direct supply current will flow through the deflection generator when no beam current is derived from the high-voltage source. As a consequence, the core of the transductor is already premagnetized so that the remaining control-range is restricted. In order to mitigate said disadvantage a known method of compensating the permagnetisation may be used.

A very simple method of control is obtained by using a deflection generator circuit as described in U.S. patent application Ser. No. 454,081, filed May 7, 1965.

The last mentioned arrangement comprises two circuit elements, one for producing the deflection current and the high voltage with a low beam current and one for supplementing power with an increasing beam current, i.e., with an increasing high-voltage load. The supply current for the second circuit element is a substantially linear function of the high-voltage load and may be used without further complications for controlling the transductor.

Figure 2:
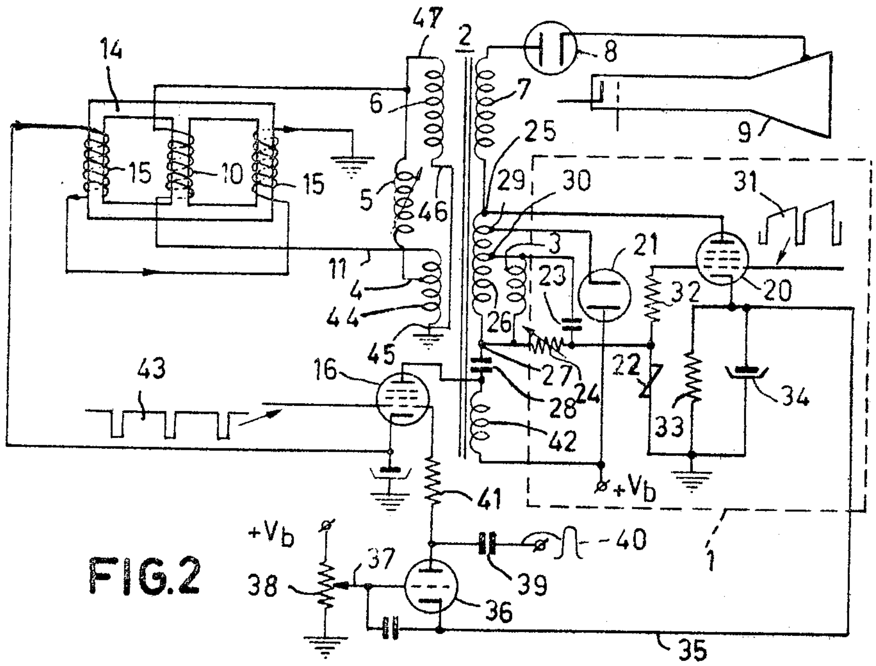
FIG. 2 shows an embodiment in which the primary and the secondary windings are arranged on a common core.

An example of the latter, in which electron tubes are used for the said circuit elements, is shown is FIG. 2, in which corresponding parts are designated as far as possible by the same reference numerals as in FIG. 1. The primary winding and the secondary winding 7 are wound on a single core of the transformer 2.

FIG. 2 shows further details of the deflection generator. It comprises an electron tube 20, operating as a first circuit element, an efficiency diode 21 and a stabilizing circuit formed by a voltage-dependent resistor (VDR) 22, a capacitor 23 and a variable resistor 24. The anode of the tube 20 is connected to one end 25 of the primary winding 26 the other end 27 of which is connected to a capacitor 28 associated with the efficiency diode circuit.

The cathode of the efficiency diode 21 is connected to a tapping 29 and the anode thereof is connected to the positive terminal $+V_b$ of the voltage supply source for the generator 1. The deflection coil 3 is connected between tappings 27 and 30.

The deflection generator 1 operates in known manner and is controlled by a control signal 31, which is applied to the first control grid of the tube 20. The negative bias voltage of said tube is varied by means of the stabilizing circuit as a function of the high-voltage load, and to this end the first control-grid is connected through a resistor 32 to the voltage-dependent resistor 22. As a result, the direct current passing through the tube 20 will slightly vary as a function of the high-voltage load, which results in a variable voltage drop across the cathode resistor 33, which is shunted by a smoothing capacitor 34. This voltage drop is transferred through the conductor 35 to the cathode of an additional amplifying element 36, which supplies the control-voltage proper for the amplifying element 16. To this end the control-grid of the element 36 is connected to a variable tapping 37 of potentiometer 38, one end of which is connected to the positive terminal $+V_b$ and the other end of which is connected to ground. With the aid of the variable tapping 37 the bias voltage for the element 36 can be controlled to set the value of beam current of the tube 9 at which the amplifying element 36 will draw current and thereby produce a variation in the bias voltage of the amplifying element 16. In order to obtain the desired negative voltage for the element 16, fly-back pulses 40 are applied to the anode of the amplifying element 36 through a capacitor 39. Said pulses can be derived from the transformer 2. The anode of the element 36 is connected through a grid leak resistor 41 to the control-grid of the element 16.

The element 16, as is shown in FIG. 2, is an electron tube which has two functions. In the first place, the tube 16 operates as a second circuit element in the manner described in the aforesaid U.S. Patent Application. To this end the anode of the tube 16 is connected through an additional winding 42 to the positive terminal $+V_b$. An identifying signal 43 is applied to the control grid of said tube. This signal is in synchronism with the control signal 31 and cuts off the anode current of the tube 16 when the anode current of the tube 20 is cut off.

In the second place the tube 16 operates an an amplifying element in order to obtain an increasing direct current through the control-winding 15 of the transductor with increasing beam current in the tube 9. To this end the cathode of the tube 16 is connected through the control winding 15 to ground. Consequently, when the beam current of the tube 9 increases, the voltage drop across the cathode resistor 33, amplified by the amplifying element 36, will vary the average current through the tube 16 and hence the control-current of the winding 15 by means of the said stabilising circuit. Since the control-current of the winding 15 increases with an increasing beam current, the permeability of the core material 14 will decrease thereby reducing the value of the inductor 10.

In the embodiment shown in FIG. 2 there is provided an additional primary winding 44, which is wound on the core 2 so that it is chiefly coupled with the primary winding 26. The reason thereof will be described more fully with reference to FIG. 4. The additional winding 44 is provided with a tapping 4, which has the same function as the tapping 4 of FIG. 1. It has an end 11, which may be compared with the tapping 11 of FIG. 1. The remaining end 45 of the winding 14 is connected on the one hand to ground, and on the other hand to an end 46 of the tertiary winding 6, the other end 47 of which is connected through the inductor 5 to the tapping 4. The tertiary winding 6 must again be coupled as far as possible only with the secondary winding 7 and the manner in which this can be achieved will be explained with reference to FIG. 4. The end 47 is furthermore connected through the variable inductor 10 to the end 11. The operation of the arrangement of FIG. 2 corresponds chiefly with that of the arrangement of FIG. 1 as far as the variation of the transformation ratio, the reduction of the fly-back time and the adaptation to the "third harmonic tuning" are concerned. Since the primary winding 26 and the secondary winding 7 are already arranged on a single core, there is a coupling between these two windings, so that without the additional windings 6 and 44 a stray inductance is obtained. By providing the windings 6 and 44 this stray inductance is reduced. The extent of the decrease depends upon the magnitude of current passing through the windings 6 and 44.

If it is assumed that with a very low beam current through the tube 9 the value of the inductor 10 is so high that practically no current will flow through said inductor, it will be obvious that the passage of current through the windings 6 and 44 is determined on the one hand by the value of the inductor 5, and on the other hand by the number of turns of the tertiary winding 6 with respect to the number of turns of the additional primary winding 44 between the tappings 4 and 45. The windings 6 and 44 are wound in the same sense on the transformer 2 and since the number of turns of the tertiary winding 6 is practically equal to the number of turns between the tappings 4 and 45, the voltage at the tapping 4 will be substantially equal to that of the end 47. Therefore the current passing through the inductor 5 will be fairly small. As the inductor 5 is reduced, an increased current will pass through the windings 6 and 44 and back through the coil 5, so that an additional coupling is established between the primary winding 26 and the secondary winding 7, which results in a reduction of the stray inductance. If necessary the inductor 5 may be variable in order to adjust in this manner for example for a beam current O the over-all stray inductance between primary and secondary so that the third harmonic tuning is achieved. However, if the stray inductance between the primary winding 26 and the secondary winding 7 has a value such that the "third harmonic tuning" is achieved, the inductor 5 may be emitted. However, the effect of the variation of the transformation ratio described with reference to FIG. 1 is then not obtained, since there is no coupling between the tapping 4 and the end 47.

Otherwise the arrangement of FIG. 2 operates like that of FIG. 1. As soon as the inductor 10 is reduced by an increase of current through the control-winding 15, a current will flow through the windings 6 and 44 through the inductor 10. As a result the three effects referred to in FIG. 1 are again obtained.

Although in the embodiment shown in FIG. 2 the winding 44 is shown as a separate winding, it will be obvious that the winding 44 may be combined with the winding 26. To this end the tappings 4 and 11 have to be provided on the primary winding 26 and be connected in the manner shown in FIG. 2, and the end 46 of the tertiary winding 6 has to be connected to the end 27 of the primary winding 26.

Figures 3, 4:
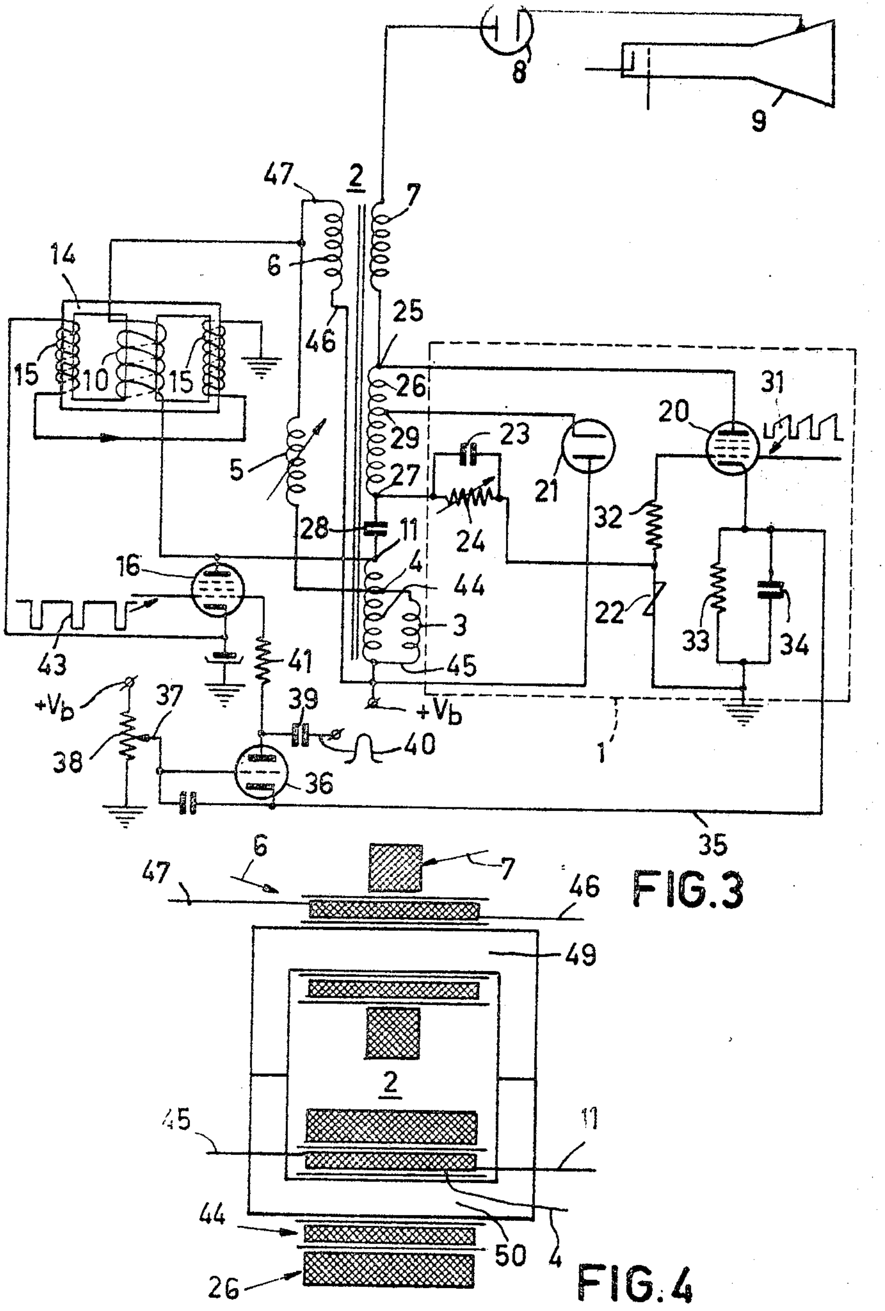
FIG. 3 shows a slightly modified embodiment as compared with FIG. 2.
FIG. 4 shows a possible embodiment of a transformer employed in the embodiments of FIG. 2 or FIG. 3.

It is also possible to combine the windings 44 and 42 with each other, as is shown in FIG. 3. The winding 42 is omitted and the anode of the tube 16 is connected to the end 11, whereas the end 45 is not connected to ground, but is connected to the positive terminal $+V_b$. The winding 44 then serves not only for varying the transformation ratio, reducing the fly-back time and adaptation to the "third harmonic tuning," but also to complete power to the high-voltage load at an increase in beam current. As shown in FIG. 3 the deflection coil 3 is coupled with the additional winding 44 instead of to the winding 26.

FIG. 4 shows a possible embodiment of the transformer 2 as employed in the arrangements of FIGS. 2 and 3. The core of this transformer consists of two united U-shaped cores, there being thus formed a closed magnetic circuit having two lateral limbs 49 and 50, interconnected by two intermediate pieces. On one lateral limb 50 there is first wound the additional auxiliary winding 44, on which the primary winding 26 is wound. It is thus ensured that a very fixed coupling is established between the primary winding 26 and the additional winding 44. On the other lateral limb 49 there is first wound the tertiary winding 6, on which the high-voltage winding 7 is wound. In a manner similar to that of the windings 26 and 44 it is ensured that a fixed coupling is established between the windings 6 and 7.

The winding 42 may be includes in the winding 26. If the winding 42 is combined with the winding 44, that is to say when the winding 42 is, in fact, omitted, said inclusion of the winding 42 is out of the question.

The windings 44 and 6, particularly in the arrangement of FIG. 2, may both be wound on an intermediate piece between the lateral limbs 49 and 50. However, the winding 6 has to be disposed in the vicinity of the winding 7 and the winding 44 in the vicinity of the winding 26. By displacing the two coils on said intermediate pieces, a greater or weaker coupling may be adjusted at will.

What is claimed is:

1. A circuit arrangement for producing a sawtooth current in a deflection coil and a high voltage for the anode of a cathode ray display tube comprising, a transformer having a primary and secondary windings, a deflection generator having an output coupled to said primary winding for causing a sawtooth current to flow therein, a deflection coil connected to said primary winding, a rectifier connected to said secondary winding for rectifying the fly-back pulses of the sawtooth current, means for applying the rectified pulses as a high voltage to the final anode of the display tube, reactive coupling means between said primary winding and the secondary winding including a reactance element connected in parallel with at least a part of the primary winding, control circuit means which varies said reactance element as a function of the high voltage load in a manner such that the high voltage is stabilized, said reactive coupling means including a variable reactive element which is varied by said control circuit so that, for substantially any high voltage load, the current through said reactive element and the voltage across it are zero both at the beginning and at the end of the flyback period.

2. A circuit arrangement as claimed in claim 1, further comprising a tertiary winding connected in series with said variable reactive element, the tertiary winding being magnetically coupled with the secondary winding, means coupling said series combination with at least part of the primary winding, a fixed impedance element serially connected with said tertiary winding to form a second series combination, and means coupling said second series combination with a smaller part of the primary winding.

3. A circuit arrangement as claimed in claim 2 wherein the variable reactive element comprises a variable inductor and the fixed impedance comprises a coil.

4. A circuit arrangement as claimed in claim 1 wherein the transformer comprises a core of magnetic material which is provided with two limbs, the primary winding being wound on the first limb and the secondary winding on the second limb, a tertiary winding being wound on the second limb and an auxiliary winding being wound in the same sense on the first limb, the latter winding having a tapping, an auxiliary coil, means connecting one end of the tertiary winding through said auxiliary coil to said tapping of the auxiliary winding, means connecting one end of the auxiliary winding to the other end of the tertiary winding, the number of turns of said auxiliary winding between the tapping and said one end thereof being substantially equal to the number of turns of the tertiary winding so that substantially the same voltage appears across the parts of the auxiliary winding and of the tertiary winding thus connected, means connecting the other end of the auxiliary winding to one end of the variable reactive element, means connecting the other end of said variable reactive element to the junction of the auxiliary winding and the tertiary winding.

5. A circuit arrangement as claimed in claim 1 further comprising an auxiliary control element, means for applying a signal to said control element that produces a periodic current flow in said control element, said signal being in synchronism with a control signal that controls the deflection generator, means connecting said control element through an additional winding which is closely coupled with the primary winding, to a supply source, means for increasing the average current through said auxiliary control element as the high voltage load current increases, said variable reactive element comprising a transductor provided with a core of magnetic material having a non-linear magnetic permeability characteristic curve, a control winding on said core coupled to said control element so that the current passing through the control element also flows through said control winding, and a coil wound on said core and coupled to said primary winding to provide an inductance that varies with said load current.

6. A circuit arrangement as claimed in claim 5 wherein the additional winding and the auxiliary winding are united to form a single winding.

7. A circuit arrangement as claimed in claim 4 wherein said transformer comprises a single core composed of magnetic permeable material and having first and second outer limbs and two intermediate pieces for completing the magnetic circuit, said auxiliary winding being directly wound on the first limb and the primary winding being wound on said auxiliary winding, the tertiary winding being directly wound on the second limb and the secondary winding being wound on said tertiary winding.

8. A voltage regulating circuit comprising transformer means having a primary and a secondary winding, means for producing a sawtooth current flow in said primary winding, high voltage load circuit means, rectifier means coupled to said secondary winding, means for coupling said load circuit means to said rectifier means, reactive coupling means for coupling said primary winding to said secondary winding and including a variable reactance element coupled to said primary winding, and means responsive to variations in the magnitude of the load current for varying the reactance of said variable reactance element in accordance therewith so as to maintain the current through said variable reactance element and the voltage across it at a zero value at the start and at the end of the flyback period despite said variations in the load current.

9. A regulating circuit as claimed in claim 8 wherein said reactive coupling means further comprises, a tertiary winding closely coupled with said secondary winding, an impedance element, means serially connecting said variable reactance element and said tertiary winding to a portion of said primary winding, and means serially connecting said impedance element and said tertiary winding to a smaller portion of said primary winding.

10. A regulating circuit as claimed in claim 8 wherein said reactive coupling means further comprises a tertiary winding magnetically coupled with said secondary winding and said variable reactance element comprises a saturable reactor having a magnetic core on which are wound a control winding and a main winding, said means for varying being arranged to pass a current through said control winding that varies in accordance with the current flow in said load circuit, and means connecting said main winding in series with said tertiary winding across a portion of said primary winding.

11. A regulating circuit as claimed in claim 8 wherein said reactive coupling means further comprises a tertiary winding and an auxiliary winding and wherein said transformer means comprises a single core of magnetic material having first and second limbs, said auxiliary winding and said primary winding being wound on said first limb and said tertiary winding and said secondary winding being wound on said second limb, said variable reactance element comprising a variable inductor connected in series with said tertiary winding and said auxiliary winding, and an inductance element connected between a tap point on the tertiary winding and a tap point on the auxiliary winding.

12. A regulating circuit as claimed in claim 8 wherein said reactive coupling means further comprises a tertiary winding magnetically coupled with said secondary winding and said variable reactance element comprises a saturable reactor having a magnetic core on which are wound a control winding and a main winding, said means for varying comprising an active control element having first and second electrodes that define a current path and a control electrode for controlling the current in said path, means connecting said control winding in series with said control element current path and a source of supply voltage, means for deriving a control voltage that varies with the current in said load circuit means, means for applying said control voltage to the control electrode of said active control element, and means connecting said main winding series with said tertiary winding across a portion of said primary winding.

References Cited

UNITED STATES PATENTS 3,217,236 11/1965 Alma et al. -------- 315—27 X

RODNEY D. BENNETT, *Primary Examiner.*

BRIAN L. RIBONDO, *Assistant Examiner.*